Nov. 27, 1945.    I. ROTHENBERG ET AL    2,389,934
METHOD OF AND APPARATUS FOR FABRICATING SHOULDER PAD BLANKS
Filed Feb. 28, 1944    5 Sheets-Sheet 3
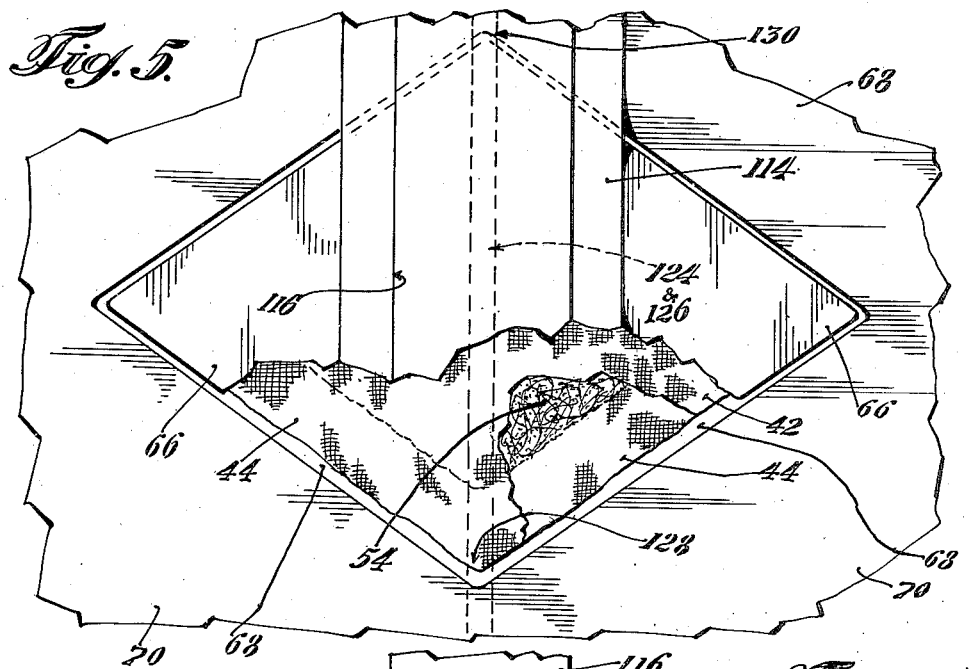
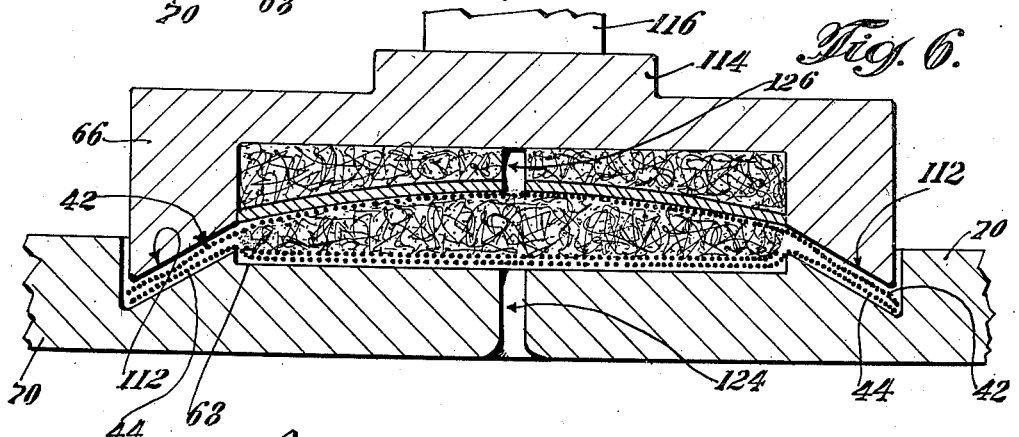
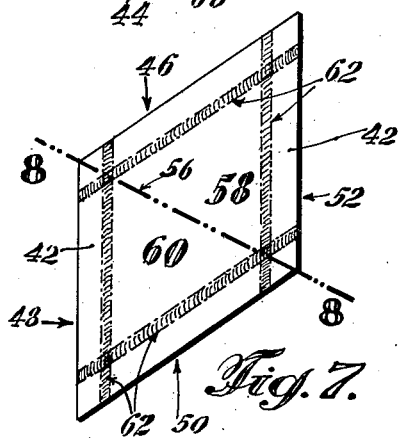
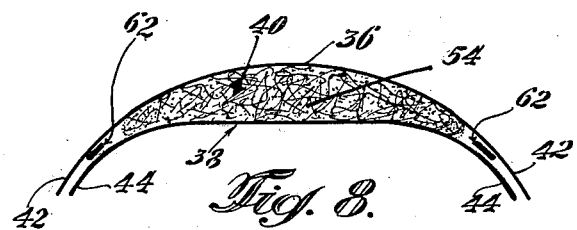
INVENTORS
Simon Kagen
Irving Rothenberg
BY Samuel J. Gurewitz
Atty. Irving J. Goodfriend

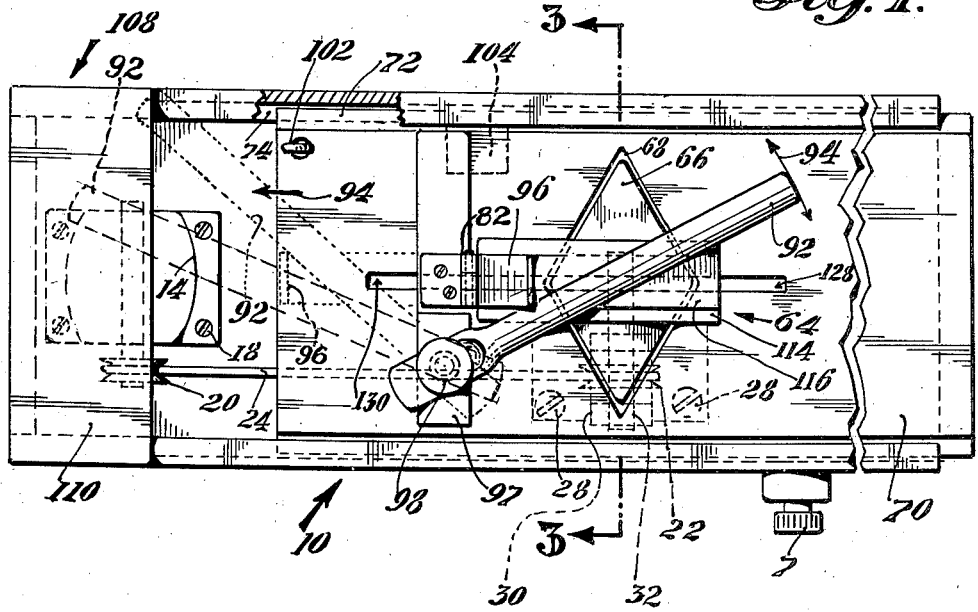
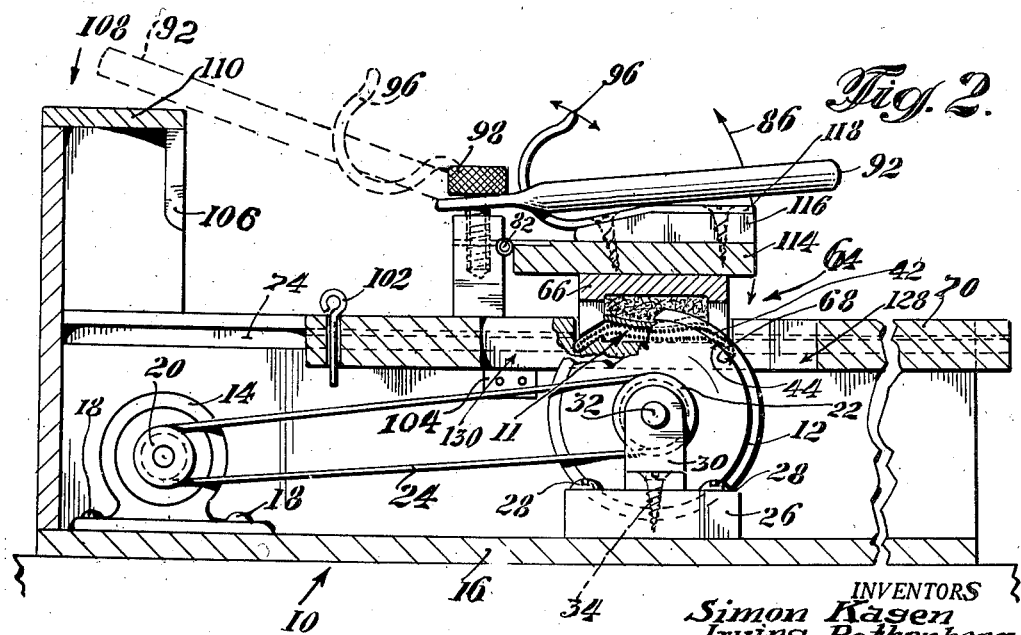

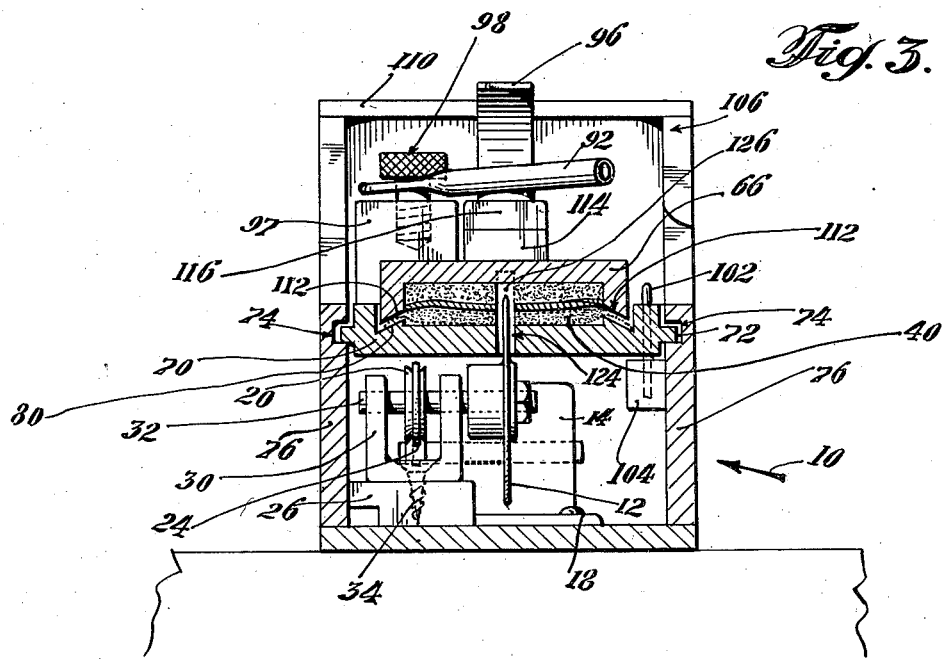
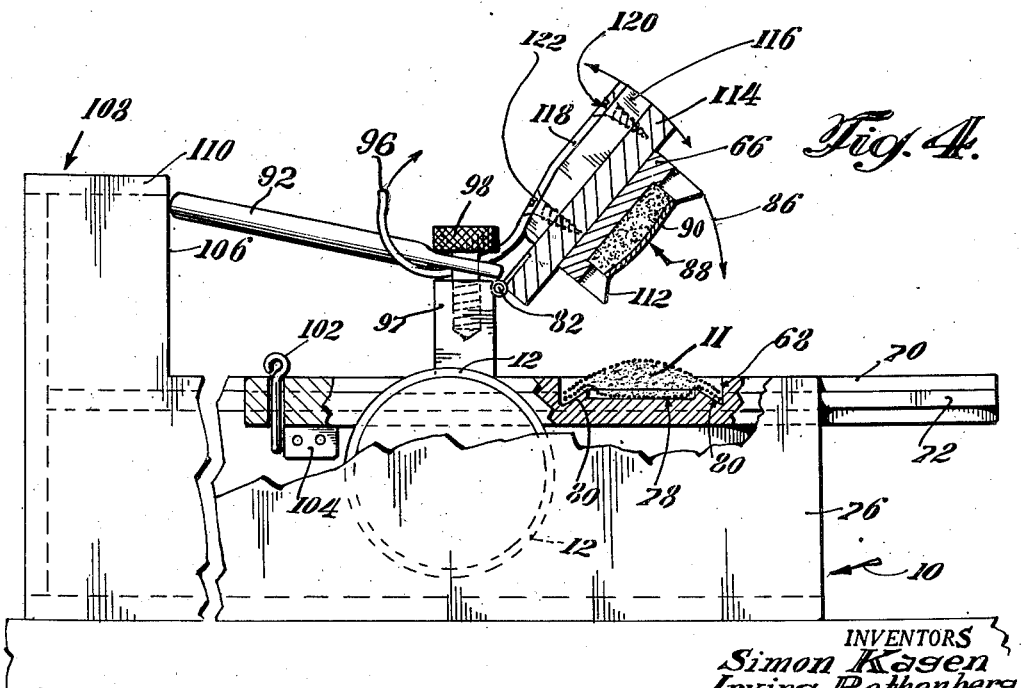

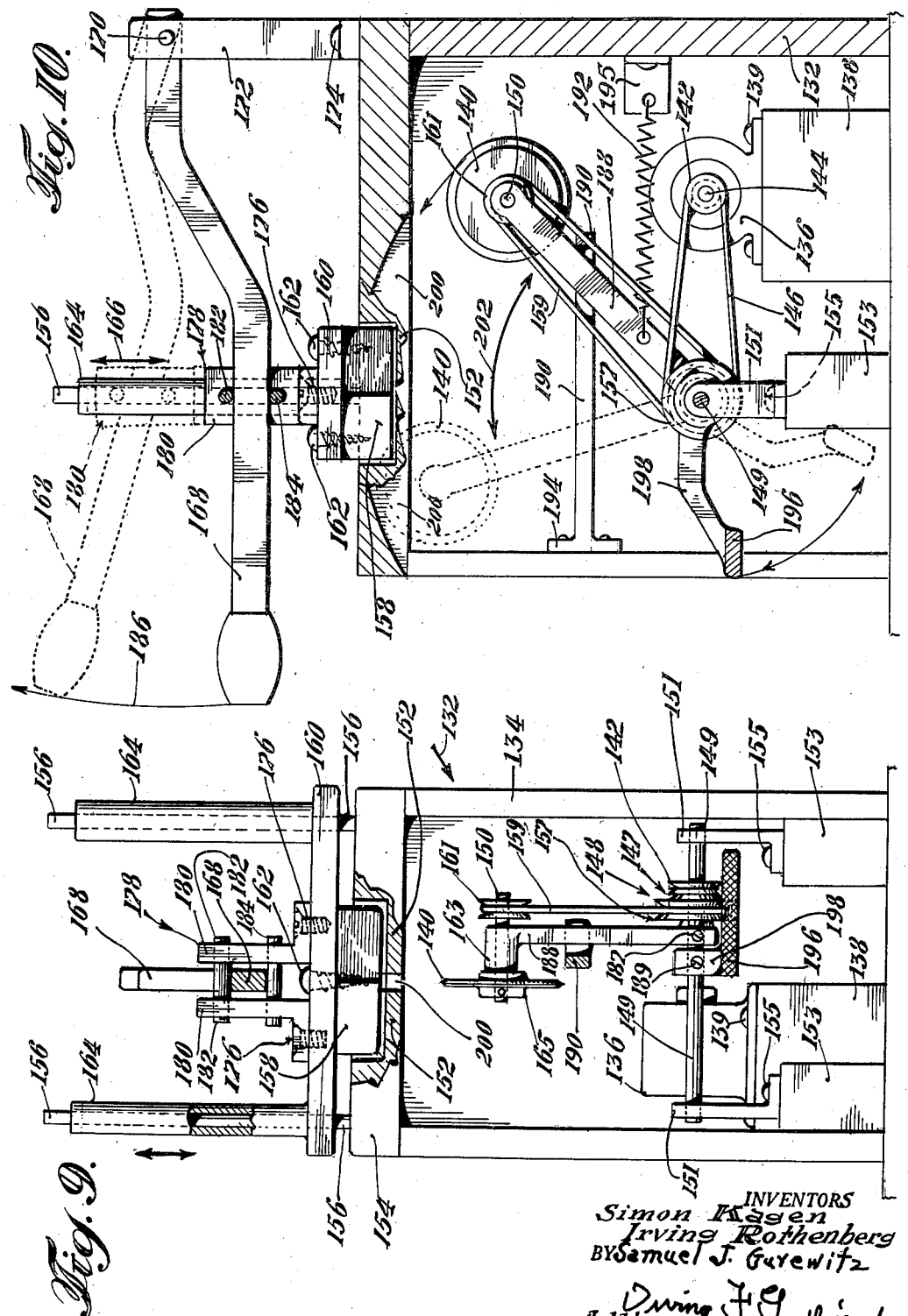

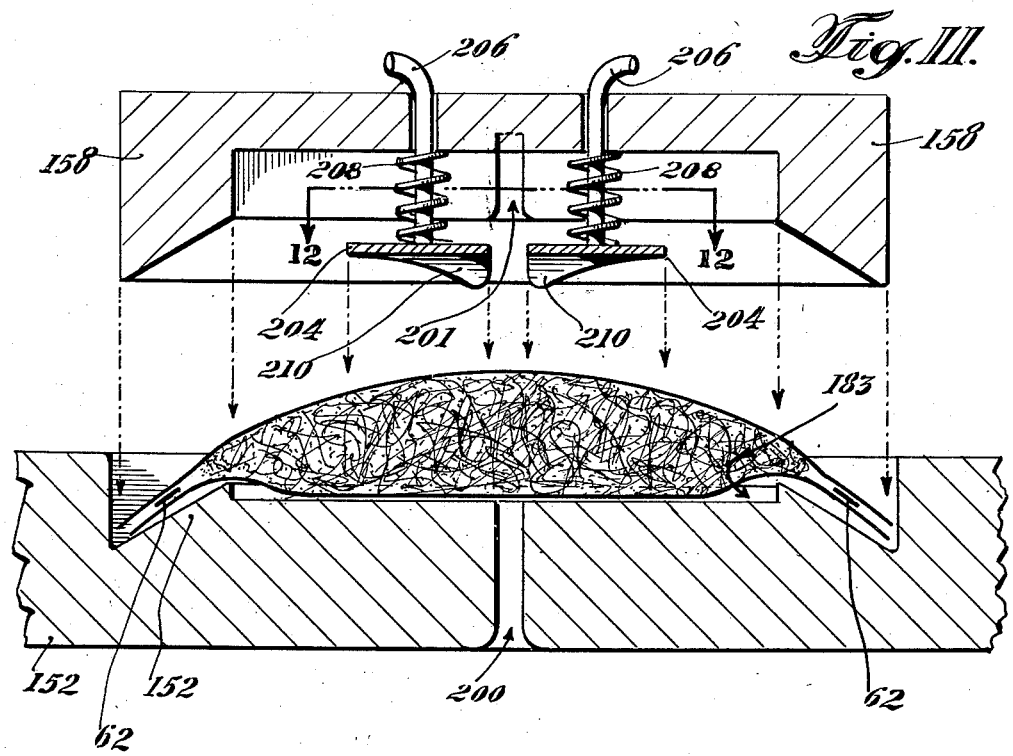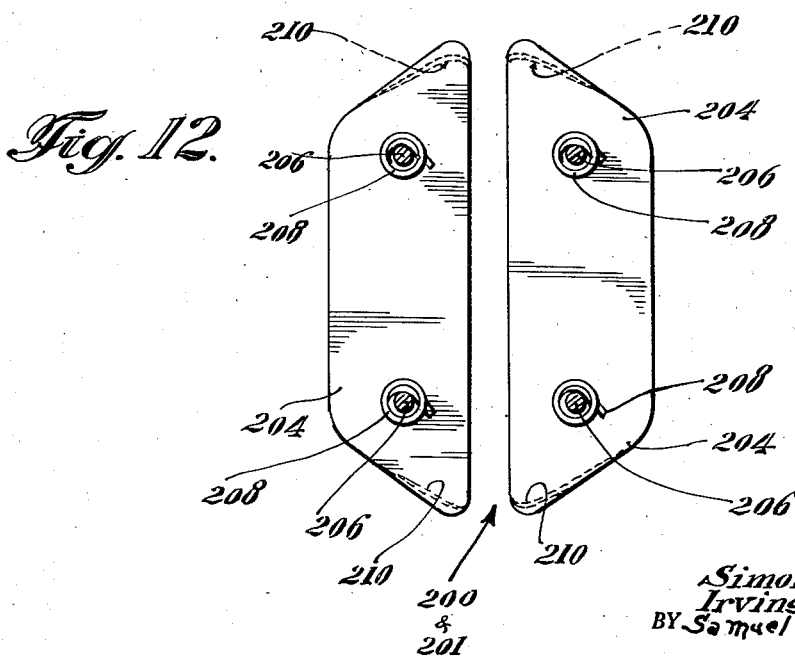

Patented Nov. 27, 1945

2,389,934

UNITED STATES PATENT OFFICE 2,389,934

METHOD OF AND APPARATUS FOR FABRICATING SHOULDER PAD BLANKS

Irving Rothenberg, Simon Kagen, and Samuel J. Gurewitz, New York, N. Y.; said Gurewitz assignor to said Kagen and said Rothenberg Application February 28, 1944, Serial No. 524,278

15 Claims. (Cl. 154—29)

The present invention relates to an apparatus for and method of manufacturing shoulder pads conventionally found in garments, such as dresses and suits and particularly to such apparatus and method whereby pads of unvarying uniform size and shape may be produced in mass quantity.

Shoulder pads, used in the garment trades, are three-cornered and comprise an upper and lower facing, of suitable material, sewed together to form a casing or housing for the filler of cotton, wool or hair fibres, which gives substance to the pad and is so shaped that the shoulder pad is relatively thick at the centre thereof and uniformly tapers off therefrom and the base thereof to the two adjoining sides.

Conventional shoulder pads are also preferably given a shape somewhat concave in cross-section so that they will thereby correspond to the form of the shoulder of the wearer.

The facings used in the manufacture of such shoulder pads are usually four sided, that is square or rectangular in shape and have the filler inserted between them, which filler is similarly shaped.

With heretofore used methods of manufacture, after the filler was inserted between the facings, the facings were then sewed together along the four edges thereof lying against and surrounding the periphery of the filler to thereby form a closed cushionlike fabricated unit.

This unit was then cut diagonally in half from one corner to the opposite corner to form two three cornered complemental blanks, which are each thus used or are covered with a cloth material sewed thereabout to form the shoulder pad used in commerce by the garment trade, particularly quantity manufacturers of ladies coats, dresses and suits.

Hundreds of thousands of such pads are used, which must therefore be sold in different standardized sizes and shapes.

It is essential that the shoulder pads be uniform in size and shape so that each need not be matched by a garment manufacturer but will lend themselves to the large scale production methods employed to make the garments on which they are used and which will therefore also be uniform in size.

Heretofore, as pointed out, the facings were sewn together around the circumference, the filler positioned inside and therefore as each of the four edges were sewn separately, the filler, since it was not held against movement relative to the facings, had a tendency to be pushed away from the sewing needle so that the resulting unit very often was not the uniform rectangle or square originally commenced with.

As a result, when such fabricated unit was cut in half, the complemental three-cornered halves were not of the same size or shape and either had to be discarded as was usual, or special effort had to be taken to match each half with some other half so that pairs of equal or complemental shoulder pads were obtained, which was relatively costly both in labor and material and not satisfactory for the mass production methods required.

The present invention therefore contemplates the provision of an apparatus by means of which the facings and filler are secured together to form unvarying fabricated units, which when cut in half provide shoulder pad blanks that are absolutely uniform in size and shape.

The present invention also contemplates the provision of an apparatus by means of which the facings and filler are held together against possible movement relative to one another as they are secured together preferably without sewing, and concurrently cut to form complemental shoulder pad blanks that are always unvarying in size and shape.

By means of the apparatus and method, according to our invention, shoulder pads of standardized size and shape can now be produced on a mass production scale with a reduction in the heretofore required labor and at a cost considerably lower than with the heretofore used apparatus and methods of manufacture and with uniformity not previously attained.

Other objects and advantages of the present invention will become apparent from the description which follows and the drawings appended thereto in which Fig. 1 is a plan view, partially broken away to condense the drawing, of an apparatus according to our invention, the mold members having been moved toward the rear of the apparatus for the blank cutting operation.

Fig. 2 is a partial cross-section and side elevation thereof.

Fig. 3 is a section on the line 3—3 of Fig. 1.

Fig. 4 is a side elevation of our apparatus with the upper mold member in raised position and the mold members moved to the front thereof for the loading operation, the apparatus broken away to condense the drawing.

Fig. 5 is a plan view of the mold, partially broken away to show the shoulder pad unit therein.

Fig. 6 is a cross-section along the line 6—6 of Fig. 5.

Fig. 7 is a plan view of a shoulder pad blank.

Fig. 8 is a cross-section on the line 8—8 of Fig. 7.

Fig. 9 is a front elevation of a modification of our invention.

Fig. 10 is a side elevation thereof on the line 10—10 of Fig. 9.

Fig. 11 is a vertical section of the mold members thereof, the upper member in raised position.

Fig. 12 is a plan view of the mold members thereof.

Referring now to the drawings and more particularly to Figs. 1 and 4 thereof, a housing or frame 10 is provided to carry the elements of our apparatus, in the interior of which housing we arrange a cutting means for the unit to be fabricated in the apparatus, such as the rotary cutting knife 12, the function of which will be described.

The cutting knife 12 is driven by a motor 14, which is secured to the floor 16 of the housing, as by means of the screws 18, preferably through the pulleys 20 and 22 and the belt 24.

The knife 12 is carried on the platform 26 in position to diagonally cut the molded shoulder pad unit 11 in half to form the complemental shoulder pad blanks, as will be further described.

This platform 26 is secured to the floor 16 of the housing 10 as by the screws 28 and carries the supports 30 in which the knife shaft 32 is journalled, the supports being fixed to the platform, also as by screws 34.

In the art, conventional shoulder pads heretofore were made by sewing together a square or rectangular upper facing 36, of suitable coarsely woven material, such as buckram, with a filler 40 of cotton, wool or hair fiber between it and a lower facing 38.

We have illustrated in Figs. 7 and 8 the application of our invention to the conventional shoulder pad form and refer to these figures also to show wherein our invention is similar thereto and wherein it differs therefrom.

Heretofore the overlapping edges 42 and 44 of these facings have been sewed together at and around the peripheral edges of the filler which is held therebetween as the operator sews first along one side 46 of the square or rectangle, then continues along the other sides 48, 50 to close the blank along the last side 52 (Fig. 7).

It will be recognized that in such case, the filler 40 is not at all times immovably held relatively to the two facings but often times will be pushed by the sewing needle away from it.

This is particularly true because of the shape of the filler, which is comparatively thick at the center 54 and tapers off gradually toward the edges thereof and the sides of the facings.

As a result, the sewed unit will not be a uniform square or rectangle, so that when it is cut in half along the diagonal line 56, the complemental halves 58 and 60 will be different in shape and size.

Even were the two halves equal in size and shape, since comparatively unskilled and inexpensive labor is required, the unit heretofore was not always cut into parts that were of the same size and shape, since the relative position of the line of cut was solely dependent upon the visual selection of the individual operator and therefore varied not only with each individual but with a group of operators.

As illustrated in Fig. 8, the shoulder pad blanks are preferably given a shape which is convex in cross section so that they will somewhat correspond to the form of a shoulder of a wearer.

With prior methods this was also comparatively difficult and costly to accomplish and likewise added to the difficulties of manufacturing, on a large scale production basis, standardized shoulder pads that were uniform in shape and size.

In order to eliminate these difficulties and disadvantages of prior methods of manufacturing shoulder pads we provide an apparatus by means of which we preferably eliminate sewing together the two facings from which the unit is fabricated.

This we accomplish by providing on one of the two facings, preferably the upper facing 36, along the overlapping edge 42 thereof, a cementitious coating 62 of suitable glue or adhesive, one satisfactory example of which we have found to be a conventional fish glue.

We have found that very satisfactory results are obtained by arranging such coatings in a particular manner such as is described in detail in our co-pending application Ser. No. 524,279 for Coating apparatus and facing produced therewith, filed Feb. 28, 1944, concurrently herewith and in which the apparatus for accomplishing it is also described.

In order to secure the glue coated overlapping edge of one facing to the overlapping edge of the other facing and concurrently hold the filler against movement relatively thereto during this operation to thereby provide a fabricated unit, which will not vary in size and shape, we provide the fabricating mold which is generally indicated by the reference character 64 and which comprises the upper cavity member 66 and the lower cavity member 68.

The fabricating mold 64 is carried on the reciprocable platform 70, the tongues 72 on the sides of which ride in the grooves 74 arranged at the upper edges of the sides 76 of the housing 10, so that in operation the mold 64 may be moved back and forth to cut the fabricated facings and filler in half, as will be further described.

In operation, to load the mold 64, the platform 70 is moved to the front of the apparatus, the mold 64 unlocked (as will be described) and the upper cavity member 66 raised, as illustrated in Fig. 4.

The lower facing 38 is placed in the cavity 78 of the lower member with the overlapping edge 42 thereof extending on the outside of the cavity to lie on the preferably downwardly inclined bevelled lip 80, which extends around the periphery of the mold member cavity 78.

The filler 40 is then placed on the facing 38, it being understood that the filler is thickest at the central part thereof and tapers uniformly to the outer edges thereof and completely fills the cavity 78.

The upper facing 36, which is provided with the coating line or streak of glue 62, is placed on top of the filler so that the coated overlapping edge 44 lies on the overlapping edge 42 of the lower facing and also on the lip 80 of the lower mold member, all in registration.

The coating of glue 62 falls just outside of the periphery of the mold cavity 78 so that only the filler 40 and the covering parts of the facings are held in the cavity against movement and shaped thereby.

The upper cavity member 66 of the mold is carried by the hinge 82 on the upstanding support 97, which is secured to the reciprocable platform 70, so that it may be raised or lowered on the lower member 68 upon swinging it about the pivot in the direction of the arrow 86, as illustrated in Fig. 2, to open and close the mold 64.

The central portion or cavity of the upper mold member is formed with a resilient, compressible, though relatively hard material 90 and so shaped that the shoulder pad blank is given a concave in cross-section shape, as illustrated in Fig. 8.

In order to raise the upper mold member for loading the lower mold member, the platform 70, as stated, is moved to the front of the housing 10 and positioned there, the handle 92 unlocked by moving it (the handle) toward the rear in the direction of the arrow 94 (see Fig. 1) into the hook-like member 96.

To accomplish this, the control handle 92 is pivotally carried on the support 97 by means of the knurled headed screw 98 about which it may be swung for opening and closing the fabricating mold.

The upper mold member 64 is raised, as the handle 92 is moved into engagement with the hook-like member 96 toward the rear of the apparatus as illustrated by the dotted lines of Figs. 1 and 2 which swings it (the mold member) in the direction of the arrow 86 (see Fig. 2) on the hinge 82, to permit the loading of the lower mold member, as heretofore described.

It will be noted that the mold 64 has been moved to the front into a position away from contact with the knife 12 (see Fig. 4) so that the knife in that position will not pass through the lower mold cavity member.

The mold member can be opened only in this position by reason of the safety locking arrangement which we will now describe.

We arrange in the platform 70 a locking pin 102 which engages the stop block 104 secured to one of the sides 76 of the housing 10 upon moving the platform into said mold loading position.

This determines the loading position upon forward motion of the platform at the front of the apparatus.

The stop block 104 is positioned on the side of the housing 10 so that the mold 64 will have completely cleared the knife 12 when the mold is opened, in which position the knife is covered by the platform so that an operator will not inadvertently or accidentally come in contact with it.

The mold 64 may be completely opened only in this position when the handle 92 is swung into its furthermost rear position, whereat it engages the wall 106 of the storage compartment 108, whereat and whereby the platform is locked against movement toward the rear.

Should attempt be made to raise the upper mold member 66 at any other inward position, the handle 92 will ride on the top wall 110 of the storage compartment 108, whereat the said upper member can not be completely raised off the lower mold member.

The platform 70 may be completely removed from the apparatus for repair or substitution, by removing from the platform the pin 102 and sliding it from the housing 10; in this manner, if desired, mold members of different shapes, forms and sizes (which, it will be understood, correspond to the type of shoulder pad blank to be fabricated) may thus be used.

After the facings and filler, which are to be fabricated into the shoulder pad unit, have been placed in the lower mold member 68, the upper mold member 66 is brought down into position on the shoulder pad blank parts, the upper lip 112 coming into registration with and pressing down against the overlapping edges 42 and 44 of the facings, one of which has been coated with a glue or cement, to thereby secure one facing to the other at and around the periphery of the filler.

The shoulder pad blank as it is fabricated from the filler and facings is formed into the desired shape by the central or body portions of the mold members.

It should be noted that the means by which the facings are secured together is arranged along the perimeter of the filler so that it will be positioned solely between the lips 80 and 112, the parts held by the mold against any movement relative to each other, thereby insuring that each shoulder pad unit will always be of the same size and shape.

In order to press with sufficient force the upper member down on the lower member so that the blank will be properly shaped and so that the glued facing will adhere to the other facing, we secure to the hinged member 114, on which the upper mold member is carried, as by means of the screws 120 and 122, the anvil-like element 116 and the metallic spring-like member 118 which extends into the hook-like member 96.

The member 116 is lower at the rear end thereof, gradually increasing in height toward the front end thereof, so that as the handle 92 is rotated into the position illustrated in Fig. 1, it rides on the member 118 to force the upper mold member down with increasing pressure to thereby lock the mold members in position and thereby fabricate and shape the component parts of the blank seated in the cavity of the lower member.

It will now be recognized that the filler is immovably held in the mold as the facings are secured together so that the shoulder pad unit can not vary in size or shape, the mold members cooperating to always impart a given shape to the blank as it is held therebetween.

In this manner, we have eliminated sewing the facings together and the variations in size incumbent therewith, though it will be understood that the overlapping edges, if desired, could be secured together by stitching about the periphery of the mold as the component parts are held therein.

In order to sever the shoulder pad unit, while it is being shaped and fabricated, to thereby insure that the three-cornered shoulder pad blanks will be uniform in size, the platform 70 is moved to the rear end of the housing so that the rotating knife 12 will thereby be brought into cutting engagement with the fabricated parts to cut the shoulder pad blank in two.

In order to permit the knife 12 to pass through the mold 64 the lower mold member and the upper mold member are provided with the knife slots 124 and 126, which extend on the bias from one corner 128 to the other corner 130, the mold being positioned with respect to the knife so that the blank will be diagonally severed.

It will now be further apparent that with the apparatus used no discretion on the part of an operator is required to select the line severing the component parts of the shoulder unit but that this diagonal line of cut is always fixed thereby insuring that the three-cornered components will not vary in size or shape.

It will be further apparent that the periphery about which the two facings are joined together will never run into the filler part of the fabricated unit.

It will be still further apparent that the blank is severed in half while it is firmly held in fixed position by the mold members.

As a result of this arrangement absolute uniformity in size and shape will be attained, so that by means of this apparatus shoulder pads can be made on a large scale production basis with absolute uniformity.

It will be also recognized that the concave shape of the shoulder pad will not be disturbed by the cutting operation because the knife 12 is arranged at the underside of the mold so that, in effect, the cutting takes place from the bottom to top of the unit.

Referring now to Figs. 9 to 12, we have therein illustrated a modification of our apparatus which differs from the embodiment just described in that the mold members are stationary for cutting the shoulder pad unit in half by means of a knife which is moved through the mold members and in which modification the upper mold member is moved vertically down into the lower mold member to fabricate the three-cornered shoulder pad blanks.

In this modification, the operative parts are housed within and carried by the frame 132 between the legs 134 of which, the cutting means is arranged.

The motor 136 is supported on the platform 138, preferably at the rear of the frame 132, and is secured thereto as by the bolts 139.

A pulley 142 is secured to the motor shaft 144 and through the belt 146, connected to one face 147 of the double pulley, generally indicated by the reference character 148 drives the pulley 148.

The double pulley 148 idles on the counter shaft 149, carried in the bearing supports 151 secured to the platforms 153 on each side of the frame, as by the bolts 155.

We connect the other face 157 of the double idler pulley 148 by the belt 159 to the pulley 161 secured on the knife shaft 150, which knife shaft is journalled in the crank 163 of the arm 188.

The shaft 150 and the knife 140, to which it is connected by the collar 165, is thus driven by the motor 136, pulley 142, belt 146, idler double pulley 148, belt 159 and pulley 161.

The lower cavity mold member 152, which is similar in construction to the lower cavity member described above, with reference to the first described modification, is fixed to and carried by the top wall or platform 154 on which we provide the upstanding guide posts 156, upon which the upper mold member 158 is moved upwardly and clear of the lower mold member for the loading operation.

The upper mold member is secured to the cross bar 160 as by means of the screws 162. Extending upwardly from the cross bar are the sleeves 164, in which the posts 156 are arranged so that the cross bar and mold member can be moved up and down in the direction of the arrow 166 (Fig. 9).

In order to operatively move the upper mold member 158, we secure the handle 168 by means of the pivot pin 170 to the support 172 which latter is secured on the platform at the rear of the apparatus, as by means of the screws 174.

Secured to the cross bar 160, as by means of the counter sunk screws 176, we provide the bracket member, generally indicated by the reference character 178, and which bracket member comprises the upstanding spaced fingers 180 to which are fixed the cross guide links 182 and 184.

The handle 168 is positioned between the fingers 180 and the links 182 and 184.

To raise the upper mold member 158 from the lower member, the handle 168 is swung about its pivot 170 in the direction of the arrow 186 into the loading position illustrated by the dotted lines of Fig. 10.

Movement of the handle into this position engages the cross link 182 to carry it upward and raise the upper mold member into position to permit loading the facings and filler in the lower mold cavity 152.

After the loading operation the upper mold member is lowered by bringing the handle down against the lower link 184 and thereby force upper mold member 158 onto the coated facing, filler and other facing to fabricate the unit as described with the first illustrated embodiment of our invention.

The supporting or carrying arm 188 for the rotary knife 140 is held against the stop bar 190 in normal position away from the mold member by means of the spring 192, one end of which is secured to the knife supporting or carrying arm and its other end to the lug 195 secured on the frame 132.

The arm 188 which carries the rotary knife 140 is secured to the counter shaft 149 as by the set screw 187.

Also secured to the counter shaft 149, as by the set screw 189, we provide the treadle bar or foot pedal 196 extending from the arm 198.

The arm 188 and knife 140 are thus pivoted in the bearing supports 151 and pulled away from the mold members to be thereby normally positioned against the stop bar 190 by the spring 192.

To diagonally cut the unit that is being fabricated in the mold into the complemental shoulder pad blanks, the pedal 196 is stepped on to cause the knife to swing with the supporting arm 188 against the tension of the spring 192 and move the knife through the knife slots 200 and 201 in the mold cavity member 152 and 158 in the direction of the arrow 202 into the position indicated by the dotted lines in Fig. 10.

Upon release of the foot pedal, the spring 192 returns the knife and its supporting arm to its normal position out of and away from the mold members.

Referring now to Figs. 11 and 12, we have there illustrated the upper mold member 158 with the unit holding fingers 204.

These fingers are secured to the pins 206 and are normally forced downward by the springs 208.

The fingers are positioned adjacent the knife slots 200 and 201 and have the slightly bent over ears 210 so that when the mold is locked and the knife operated to cut the fabricated unit in half, it (the fabricated unit) is firmly held thereby to make the unit somewhat more rigid thereat as the knife cuts through it.

It will of course be understood that the other heretofore described elements and the operation of this apparatus is similar to or like the elements of the first described embodiment of our invention and the same advantages apply to it.

Since various changes and modifications may be made by those skilled in the art in the above description without departing from the nature or spirit thereof, we do not intend that our invention is to be restricted to the embodiments illustrated herein except as set forth in the appended claims.

We claim:

1. An apparatus for fabricating shoulder pad blanks from at least a pair of facings and a filler therebetween; said apparatus including a housing; a platform reciprocable therein; a lower mold member on the platform and having a cavity in which the facings and filler are to be seated relatively to each other for fabricating the shoulder pad blanks; a downwardly bevelled lip around the periphery of the cavity; an upper mold member hinged on the platform for raising the upper mold member from and lowering it into operative engagement with the lower member, said upper member having a cavity in which the facings and filler are to be received upon lowering the upper mold member into engagement with the lower mold member; a second bevelled lip around the periphery of the cavity in the upper mold member for engaging the first mentioned bevelled lip upon bringing the upper mold member into engagement with the lower mold member; a knife in the housing; a handle pivotally arranged on the platform; and an element on the upper mold member having a hook, upon pivoting the handle in one direction, to be engaged by the handle for raising the upper mold member and an inclined body to be engaged by the handle, upon pivoting it in another direction, said mold members having aligned slots therein arranged diagonally thereof from one corner to an opposite corner for receiving the knife upon reciprocating the platform and said mold members shaped to impart a selected form to a shoulder pad blank as it is fabricated in the apparatus.

2. In an apparatus of the character described for fabricating a shoulder pad blank, a mold comprising two members, one member movable into and out of engagement with the other member, each member having a shaped cavity aligned with the other cavity upon moving one member into engagement with the other member to fabricate therein a blank forming unit, each member having a lip surrounding the periphery of the cavity therein, each lip movable into engagement with the other lip and cutting means movable through the mold to cut the unit and thereby form therefrom shoulder pad blanks.

3. In an apparatus of the character described for fabricating shoulder pad blanks, two mold members, each member having a mold cavity and a lip extending around the periphery of the cavity, one member movable into and out of engagement with the other member, each cavity aligned with the other cavity and each lip brought into registration against the other lip upon moving one member into engagement with the other member to fabricate therein a blank forming unit and cutting means movable through the mold to cut the unit and thereby fom therefrom shoulder pad blanks.

4. In an apparatus of the character described for fabricating shoulder pad blanks, two mold members, each member having a mold cavity and a lip extending around the periphery of the cavity and diverging therefrom at an angle thereto, one member movable into and out of engagement with the other member, each cavity aligned with the other cavity and each lip brought into registration against the other lip upon moving one member into engagement with the other member to fabricate therein a blank forming unit and cutting means movable through the mold to cut the unit and thereby form therefrom shoulder pad blanks.

5. An apparatus for fabricating shoulder pad blanks from at least a filler interspaced between two facings having overlapping edges extending from and around the periphery of the filler, said apparatus comprising a lower member having a cavity and a lip extending therearound for seating the filler and facings in the cavity with the overlapping edges on the lip and an upper member movable into and out of engagement with the lower member, said upper member having a cavity and a lip extending therearound, said cavity in the upper member brought into alignment with the cavity on the lower member for receiving the filler and the facings in the upper mold cavity and said lip on the upper member brought into registration with the lip on the lower member against the overlapping edges seated thereon upon moving said upper member into engagement with the lower member.

6. The apparatus of claim 5, said members each having a slot aligned with the slot on the other member upon moving said upper member into engagement with the lower member, said slots extending through the members diagonally thereof and cutting means for movement through the slots.

7. An apparatus of the character described, comprising a housing, a platform therein, a mold thereon comprising two cavity members, one of said cavity members fixed to the platform and the other of said cavity members secured thereon for movement into and out of engagement with the first mentioned cavity member, handle means for moving said second mentioned cavity member into and out of engagement with the first mentioned cavity member and cutting means in the housing, said cavity members having slots positioned diagonally of the mold for receiving therethrough the said cutting means.

8. The apparatus of claim 7, the platform being reciprocable in the housing to bring the cutting means into and out of the slot upon the reciprocation of the platform.

9. The apparatus of claim 7, said cutting means being pivotally arranged in the housing to swing the cutting means through the slots.

10. The apparatus of claim 7, said cavity members each having a face extending from and around the periphery of the cavity and brought into registration with each other upon moving the second mentioned cavity member into and out of engagement with the first mentioned cavity member.

11. The apparatus of claim 7, the second mentioned cavity member having means thereon for engagement by the said handle means for forcing the second mentioned cavity member into engagement with the first mentioned cavity member.

12. In an apparatus of the character described, a frame having a fixed platform, a mold member therein, guide posts extending upwardly from said platform, sleeves movable on said guide posts, a second mold member vertically aligned with said first mold member and carried by said sleeves, an arm pivoted to the frame, and a guide bracket upstanding from the second mentioned mold member, said arm passing through the said guide bracket and movable therein to lower and raise the second mentioned mold member into and out of engagement with the first mentioned mold member.

13. In an apparatus of the character described, a frame, a mold thereon and comprising a fixed and a movable cavity member, said movable cavity member vertically movable into and out of engagement with the fixed cavity member, a pair of spaced elements upstanding from the movable member, a pair of spaced links connecting the said spaced elements and an arm pivoted to the frame and extending between the spaced elements and the spaced links for vertically moving the movable cavity member into and out of engagement with the fixed cavity member.

14. In an apparatus of the character described, a frame, a mold member thereon having a slot extending therethrough and dividing said mold member into parts of equal dimension and similar shape, an arm pivotally secured to the frame and normally positioned away from the mold member and cutting means on the arm and movable through the slot upon pivoting the arm from said normal position.

15. In an apparatus of the character described for fabricating shoulder pad blanks, a frame, a mold member thereon to fabricate therein a blank forming unit, and a cutting means normally held in position out of said mold member and movable therethrough, said mold member having a passage for movement of said cutting means through the mold member and extending therethrough to divide said mold member into parts of equal dimension and shape, said cutting means for cutting a fabricated unit held in the mold member into shoulder pad blanks of equal dimension and shape.

IRVING ROTHENBERG.
SIMON KAGEN.
SAMUEL J. GUREWITZ.